(12) United States Patent
Maruthapillai

(10) Patent No.: US 10,836,250 B2
(45) Date of Patent: Nov. 17, 2020

(54) SYSTEM FOR SECURING FUEL IN VEHICLES USING IOT DEVICES

(71) Applicant: Periyasamy Maruthapillai, Bangalore (IN)

(72) Inventor: Periyasamy Maruthapillai, Bangalore (IN)

(73) Assignee: Periyasamy Maruthapillai, Karnataka (IN)

( * ) Notice: Subject to any disclaimer, the term of this patent is extended or adjusted under 35 U.S.C. 154(b) by 172 days.

(21) Appl. No.: 15/770,191

(22) PCT Filed: Oct. 21, 2016

(86) PCT No.: PCT/IB2016/095009
§ 371 (c)(1),
(2) Date: Apr. 20, 2018

(87) PCT Pub. No.: WO2017/068564
PCT Pub. Date: Apr. 27, 2017

(65) Prior Publication Data
US 2018/0304742 A1 Oct. 25, 2018

(30) Foreign Application Priority Data
Oct. 21, 2015 (IN) .......................... 5672/CHE/2015

(51) Int. Cl.
| B60K 15/00 | (2006.01) |
| B60K 15/04 | (2006.01) |
| G07C 5/00 | (2006.01) |
| B60K 35/00 | (2006.01) |
| B60K 15/03 | (2006.01) |

(52) U.S. Cl.
CPC .......... *B60K 15/0409* (2013.01); *B60K 15/00* (2013.01); *B60K 15/0406* (2013.01);
(Continued)

(58) Field of Classification Search
CPC ............ B60K 15/0406; B60K 15/0409; B60K 35/00; B60K 2015/03217;
(Continued)

(56) References Cited

U.S. PATENT DOCUMENTS 8,928,473 B2 * 1/2015 Gilchrist ................ B60K 15/04
340/425.5
9,533,568 B1 * 1/2017 Harvey .............. B60K 15/0403
(Continued)

*Primary Examiner* — Joshua E Rodden

(57) ABSTRACT

The present invention provides system (100) for securing fuel of motor vehicles using IoT devices. The system comprises control device (101) mounted on lid of fuel tank to control the opening and closing of the lid of the fuel tank, from remote places. The control device (101) comprises plurality of IoT sensors connected to a microcontroller unit (205), a GSM module (202) to transfer the data between the authorized user and control device (101). The control device (101) also comprises microcontroller unit (205) to execute the plurality of operations and motor (207) integrated with microcontroller unit (205) to lock or unlock the lid of the fuel tank on receiving the signal from authorized user. An application is installed onto the user's mobile device (104) to monitor and track the activities in fuel tank. A cloud based database server (103) is used for storing and analyzing the measured fuel data.

10 Claims, 2 Drawing Sheets

(52) U.S. Cl.
CPC ............. *B60K 35/00* (2013.01); *G07C 5/00* (2013.01); *G07C 5/008* (2013.01); *B60K 2015/03217* (2013.01); *B60K 2015/03434* (2013.01); *B60K 2015/0416* (2013.01); *B60K 2370/62* (2019.05)

(58) Field of Classification Search
CPC .. B60K 2015/03434; B60K 2015/0412; B60K 2015/0416; B60K 2370/62; G07C 5/00; G07C 5/008
USPC ........................................................ 220/210
See application file for complete search history.

(56) References Cited

U.S. PATENT DOCUMENTS

| | | | |
|---|---|---|---|
| 9,911,095 B2* | 3/2018 | Mashburn | G06Q 10/1097 |
| 9,919,664 B2* | 3/2018 | Vucelic | B60K 35/00 |
| 9,947,063 B2* | 4/2018 | Miller | G06Q 10/0832 |
| 2009/0056830 A1* | 3/2009 | Beier | B60K 15/0409 |
| | | | 141/350 |
| 2011/0175739 A1* | 7/2011 | McFeeters | G01F 23/2966 |
| | | | 340/584 |
| 2014/0236444 A1* | 8/2014 | Stefan | B67D 7/065 |
| | | | 701/70 |
| 2015/0352947 A1* | 12/2015 | Hubschman | B60K 15/0406 |
| | | | 340/450.2 |
| 2017/0326982 A1* | 11/2017 | Williams | B60K 35/00 |
| 2018/0141518 A1* | 5/2018 | Iverson | B60K 15/05 |
| 2018/0272866 A1* | 9/2018 | Tsai | B62K 11/14 |
| 2019/0255940 A1* | 8/2019 | Cinar | B60K 15/0409 |
| 2019/0256343 A1* | 8/2019 | Dudar | B60K 15/03 |

* cited by examiner

SYSTEM FOR SECURING FUEL IN VEHICLES USING IOT DEVICES

CROSS REFERENCE TO RELATED APPLICATION

The present application is a U.S. national stage application (under 35 USC §§ 371) of PCT international application PCT/IB2016/095009 having an international filing date 21 Oct. 2016, which claims priority from Indian application No. 5672/CHE/2015 filed with Indian Patent Office, Chennai on 21 Oct. 2015.

TECHNICAL FIELD OF THE INVENTION

The present invention relates to a system for securing the fuel in all types of vehicles using Internet of Things (IoT) devices. More particularly, the present invention relates to an automatic locking and unlocking of lid of the fuel tank from the remote places.

BACKGROUND OF THE INVENTION

IoT is the group of network devices or objects embedded with electronics or software to sense and collect data from the environment around us and then share that data across the Internet. The collected data is used to control the devices remotely across existing network infrastructure and to ensure the interface between the physical world and computer-based systems. This results in improved efficiency, accuracy and economic benefit.

This technology helps to control the devices or things or any objects which are in remote locations, on the move, unattended places, and wearable devices etc. The complete IOT echo system works based on the existing internet (IP) technologies, mobile communication technologies and wireless technologies.

Many vehicles such as trucks/lorries, taxis, buses or any four wheelers vehicle travel from one place to another place every day, but the owners of the vehicle have no access to monitor the fuel consumed by the vehicles. In recent years, there has been an increase in the fuel theft across the world, incurring huge loss to the logistics/transport companies that are struggling to secure the fuel theft. Fuel is the most expensive operation commodity in logistics/transport companies in which 50% to 60% of operation cost is spent on fuel and also the fuel prices are constantly increasing day by day. If the fuel theft is not monitored, the losses to these companies will continue to escalate unpredictably.

Various types of conventional fuel anti-theft devices are known in the prior art, wherein most of them are used only to monitor the fuel level and based on the variation of fuel level, the theft is detected. In this way fuel theft can be identified only after the fuel is stolen and there is no way to secure the fuel from theft. Typically, the existing devices check the fuel level and alert the owner of the vehicle to refill the fuel. Another drawback with the existing prior art is that, system allows the driver of the vehicle to open and close the lid of the fuel tank during refilling by manually or any other way. There are chances of fuel-theft by the driver of the vehicle as the driver has access to open and close the lid of the fuel tank. In this invention no one has access or rights to open/close the lid of the fuel tank except owner of the vehicle. This gives ultimate protection to the fuel in the vehicle.

Hence, looking at the problems in the prior art, there is a need of a system for securing the fuel of the vehicles using IoT devices that can control the opening and closing of the fuel tank lid remotely and must be simple, cost effective and accurate.

SUMMARY OF THE INVENTION

The present invention overcomes the drawbacks in the prior art and provides a system for securing the fuel in motor vehicles using IoT devices. The present invention comprises a control device mounted on the lid of a fuel tank to control the opening and closing of the lid remotely. The control device comprises a plurality of IoT sensors connected to a microcontroller unit, mobile communication modules, wireless communication modules mounted on the control device, and connected to microcontroller unit as well.

Mobile communication modules may include but not limited to 2G ($2^{nd}$ Generation Global System for Mobile communications (GSM) module, 2.5G (GSM+GPRS), 3G, TDCDMA, WCDMA, 4G-TDD/FTD or 5G technologies, so as to transfer the data between the authorized user and the control device. Wireless communication modules may be any type of short range wireless technologies that may include but not limited to Blue Tooth (BT), Wi-Fi, Infrared or ZigBee. The microcontroller unit is configured to execute the plurality of operations, and a motor integrated with microcontroller unit to lock and unlock the lid of the fuel tank remotely, upon receiving the signal from the authorized user over mobile or wireless communication channels. An application is installed onto the user's mobile device to monitor and track the activities of the fuel tank. Cloud based database server is used for storing and analyzing the data retrieved from plurality of IoT sensors, microcontroller unit, mobile communication modules, wireless communication modules and fuel tank. Could application, cloud based database server is located and connected with IP network, mobile communication network and wireless communication network. Refer the FIGS. 1 and 2 for graphical representation of this explanation.

In a preferred embodiment of the invention, the control device is used to lock and unlock the lid of the fuel tank for refilling the fuel when the fuel level is below a predefined threshold level. The control device locks and unlocks the lid of the fuel tank upon receiving the signal from the authorized user, remotely using mobile/wireless communication module.

In a preferred embodiment of the invention, the plurality of IoT sensors are ultrasound sensors, infrared sensors or any fuel level monitor sensor or any sensor that may be known in the art or forthcoming, for fuel detection/to control the device from any kind of theft or damage operation by any unauthorized person.

In a preferred embodiment of the invention, the IoT sensors measure the fuel level at regular intervals of time and send the data to the cloud based database server, where the measured fuel level data/reports may be viewed using the applications installed onto the mobile device.

In a preferred embodiment of the invention, the control device is securely mounted on the lid of the fuel tank by authorized user. Meaning of this statement is as follows, control device designed such a way that it could not be removed once it is mounted and the control device is installed on the on the lid of fuel tank. While installing the control device, there is a final command/signal from authorized user to complete and commit the installation remotely using wireless, mobile communication modules, upon receiving of this signal/command from authorized user, control device will perform self-lock operation and lock the control device with fuel tank and it cannot be removed. It can be removed only by authorized user by sending the self-unlock signal/command to the control device. This lock/unlock is completely different from locking/unlocking/opening/closing of the lid of the fuel tank.

In accordance to one embodiment of the present invention, the control device may further comprise a camera module to detect any tampering or damaging activity on the control device.

In a preferred embodiment of the invention, the authorized users receive an alert signal when the control device is tampered or damaged. This communication happened through mobile and wireless communication channels.

In a preferred embodiment of the invention, the control device sends an alert signal to the authorized user in case when there is a drastic change of fuel level. This communication takes place through mobile and wireless communication channels.

In a preferred embodiment of the invention, the control device further comprises a keypad to enter a dynamic password to unlock the lid of the fuel tank, in case the control device is not able to receive signals from the authorized user. The dynamic password is One Time Password (OTP), wherein the authorized user sends the OTP to the driver of the vehicle on request. In this particular case, authorized user contacts the support center to get OTP password, and the same password is communicated to the driver of the vehicle to unlock the lid of the fuel tank and then lid gets automatically locked after pre-defined time.

In a preferred embodiment of the invention, the system measures the efficiency of the vehicle, wherein the sensor is integrated with the odometer of the vehicle. The sensors transfer the data from odometer to the control device, wherein the control device sends the data to the cloud database/application for analysis. The data is transferred through a short range wireless communication technology such as but not limited to Infrared, Wi-Fi, Bluetooth or ZigBee.

Hence, the present invention provides a system, which is cost effective and easy to install. The system of the present invention allows the owner of the vehicle to monitor and control the fuel tank of the vehicle remotely.

BRIEF DESCRIPTION OF THE DRAWINGS

The foregoing and other features of embodiments will become more apparent from the following detailed description of embodiments when read in conjunction with the accompanying drawings. In the drawings, like reference numerals refer to like elements.

DETAILED DESCRIPTION OF THE INVENTION

Reference will now be made in detail to the description of the present subject matter, one or more examples of which are shown in figures. Each embodiment is provided to explain the subject matter and not a limitation. These embodiments are described in sufficient detail to enable a person skilled in the art to practice the invention, and it is to be understood that other embodiments may be utilized and that logical, physical, and other changes may be made within the scope of the embodiments. The following detailed description is, therefore, not be taken as limiting the scope of the invention, but instead the invention is to be defined by the appended claims.

The present invention overcomes the drawbacks in the prior art and provides a system for securing the fuel in motor vehicles using IoT devices. The present invention comprises a control device mounted on the lid of a fuel tank to control the opening and closing of the lid remotely. The control device comprises a plurality of IoT sensors connected to microcontroller unit, mobile communication modules, wireless communication modules mounted on control device, and connected to microcontroller unit as well.

Mobile communication modules may include but not limited to 2G ($2^{nd}$ Generation Global system for mobile communications (GSM) module, 2.5G (GSM+GPRS), 3G, TDCDMA, WCDMA, 4G-TDD/FTD and 5G technologies, so as to transfer the data between the authorized user and control device. Wireless communication modules may include but not limited to short range wireless technology such as Blue Tooth (BT), Wi-Fi, Infrared or ZigBee. The micro controller unit has a motor integrated with microcontroller unit to lock and unlock the lid of the fuel tank remotely, upon receiving the signal from the authorized user over mobile or wireless communication channels. An application is installed onto the user's mobile device to monitor and track the activities of the fuel tank. The system further comprises a cloud based database server for storing and analyzing the data retrieved from plurality of sensors, microcontroller unit, mobile communication module, wireless communication module and fuel tank. Here, the cloud based database server is located and connected with IP network, mobile communication network and wireless communication network. Refer the FIGS. 1 and 2 for graphical representation of this explanation.

Figure 1:
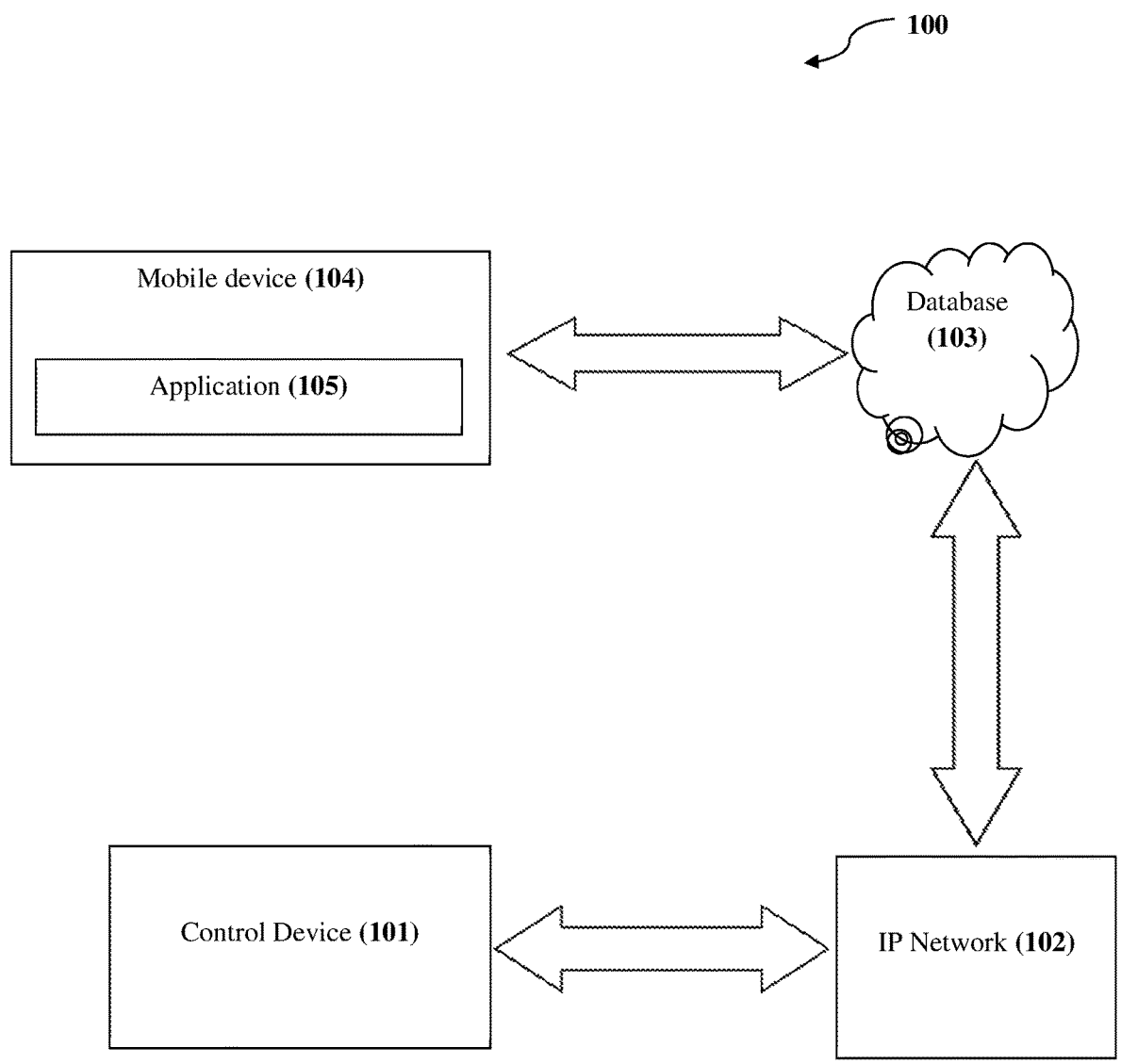
FIG. 1 illustrates a block diagram of the system for securing fuel in the vehicles using IoT devices, in accordance with an embodiment of the invention.

FIG. 1 illustrates a block diagram of the system for securing fuel in the vehicles using IoT devices, in accordance with an embodiment of the invention. The system (100) for providing security for the fuel theft comprises a control device (101) which is mounted on the lid of the fuel tank of the vehicle. The control device (101) communicates with the authorized user or owner of the vehicle through a mobile communication module or a wireless communication module. An application (105) is installed onto the mobile device (104) of the authorized user/owner, wherein the authorized user/owner monitors and controls the lid of the oil tank from remote places. The lid of the fuel tank is locked and unlocked using a mobile application (105) from a remote place, wherein a DC motor (207) of the control device (101) is used for the automatic operation of locking and unlocking the lid. The IoT sensors such as ultrasonic sensor is used in the control device (101) to sense and send the sensory data to the cloud based database server (103). The sensory data is analyzed and sent to the authorized user/owner of the vehicle, wherein the authorized user/owner of the vehicle takes the required action based on the received data.

The system (100) is designed to collect information such as but not limited to fuel level, fuel tank capacity or fuel economy information using the fuel level sensor. The sensory data obtained from fuel level sensor is stored in the cloud based database server (103), wherein the stored data is then transmitted to the mobile application (105) from the cloud based database server (103). The fuel level in the fuel tank is monitored by authorized user or owner of the vehicle either at regular intervals of time or on demand. If the fuel level is detected to be below a predefined threshold level, then the authorized user or the owner of the vehicle is notified about the fuel level. Based on the data provided by the fuel level sensor, the authorized user or owner of the vehicle sends the command to the control unit through the mobile application. The control unit (101) unlocks the lid of the fuel tank for refilling the fuel using a DC motor (207), wherein the DC motor (207) is integrated with the microcontroller unit (205) in the control unit (101). The authorized user or owner of the vehicle is notified when there is a sudden drastic change in fuel level, so that the required instant action can be taken during that time.

The control device (101) is securely installed on the lid of the fuel tank by authorized user or owner of the vehicle, wherein the control device (101) may be uninstalled from the fuel tank only by sending the command or message from authorized user or vehicle owner. The authorized user or owner of the vehicle receives an alert signal when the control device (101) is tampered or damaged by the driver or burglar.

In a preferred embodiment of the invention, the control device (101) further comprises a keypad to enter the dynamic password to unlock the lid of the fuel tank. In certain scenarios, when the control device (101) is not able to receive signals from the authorized user or owner of the vehicle, a dynamic password (i.e.) a One Time Password (OTP) is transmitted from the authorized user or owner of the vehicle, to the driver of the vehicle on request.

In another embodiment of the present invention, the system (100) measures the efficiency of the vehicle, wherein the IoT sensor is integrated with the odometer of the vehicle. The IoT sensor transfers the data from odometer to the control device (101), wherein the control device (101) sends the data to the cloud based database server (103) for analysis. The data is transferred between the IOT or any other sensors and the control device (101) using any short range wireless technique that may include but not limited to Bluetooth, Wi-Fi, infrared, ZigBee or a hotspot.

In a preferred embodiment of the invention, the plurality of IoT sensors are ultrasound sensors, infrared sensors or any fuel level monitor sensor or any sensor that may be known in the art or forthcoming, for fuel detection/to control the device from any kind of theft or damage operation by any unauthorized person.

In accordance to one embodiment of the present invention, the control device (101) may further comprises a camera module to detect any tampering or damaging activity on the control device (101).

In accordance to one or more embodiment of the present invention, the mobile device (104) may be a mobile phone, a personal digital assistant, a handheld computer, a notebook computer, a tablet computer or any hand-held device that supports two way interactions between the authorized user and the control device (101).

Figure 2:
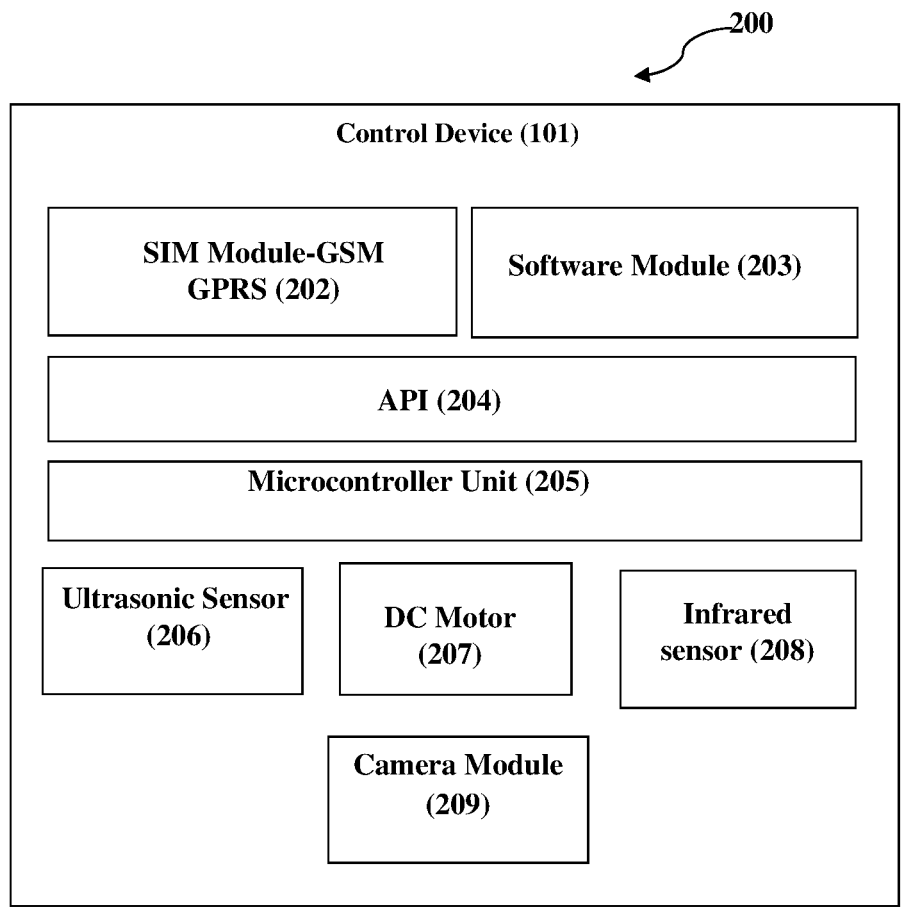
FIG. 2 illustrates a block diagram of the control device, in accordance with an embodiment of the invention.

FIG. 2 illustrates a block diagram of the control device, in accordance with an embodiment of the invention. The control device (101) is mounted on the lid of the fuel tank of the vehicle. The control device (101) comprises a plurality of IoT sensors such as ultrasonic sensor (206), infrared sensor (208) placed at various places in the vehicle. The ultrasonic sensor (206) passes the ultrasonic waves into fuel tank and retrieves the data points. The data points are stored in the cloud based database server (103) for analysis. The analyzed data is sent to the mobile application (105) installed onto the mobile device (104) of the authorized user or owner of the vehicle. The analyzed data sent to the mobile application (105) indicates the fuel level available in the fuel tank, wherein the authorized user or owner of the vehicle takes the decision to refill the fuel tank based on the data displayed in mobile device (104).

The plurality of IoT sensors are connected to a microcontroller unit (205). A global system for mobile communications (GSM) module (202) is used to transfer the data between the authorized user mobile device (104) and control device (101). The 32-bit or any type of microcontroller unit (205) is used to execute the plurality of operations such as locking and unlocking of lid of the fuel tank, monitoring the fuel level, calculating the efficiency of the vehicle based on the distance traveled. A DC motor (207) is integrated with microcontroller unit (205) to lock or unlock the lid of the fuel tank upon receiving the signal from the authorized user or owner of the vehicle. The DC motor (207) automatically locks and unlocks the lid of the fuel tank.

Hence, the present invention provides a system (100), which is cost effective and easy to install. In the present invention, the owner of the vehicle can monitor and control the fuel tank of the vehicle remotely. This system (100) alerts the owner of the vehicle about the theft irrespective of the location of the vehicle. Hence the huge revenue of the travel/logistic companies can be saved drastically.

It is to be understood, however, that even though several characteristics and advantages of the present invention have been set forth in the foregoing description, together with details of the structure and function of the invention, the disclosure is illustrative only. Changes may be made in the details, especially in matters of shape, size, and arrangement of parts within the principles of the invention to the full extent indicated by the broad general meaning of the terms in which the appended claims are expressed.

I claim:

1. A system (100) for securing fuel of motor vehicles using Internet of Things (IoT) devices, the system (100) comprising:
   a) a control device (101) mounted on a lid of a fuel tank to control opening and closing of the lid from remote places, wherein the control device (101) further comprises:
      a plurality of IoT sensors of the IOT devices connected to a microcontroller unit (205) to measure fuel level at regular intervals of time and transmits a measured fuel level data to the microcontroller unit (205), wherein the microcontroller unit (205) transmits the measured fuel level data to an application (105) installed onto a mobile device (104);
      a motor (207) integrated with the micro controller unit (205), to lock and unlock the lid of the fuel tank on receiving a signal from an authorized user of the vehicle; a camera module (209) to detect any tampering or damaging activity on the control device (101);
      a keypad to allow driver of a vehicle to enter a dynamic password to unlock the lid of the fuel tank, when the control device (101) is unable to receive signals from the authorized user;
   b) the application (105) installed onto the mobile device (104) of the authorized user receives an alert signal when the control device (101) is tampered or damaged; and
   c) a cloud based database server (103) for storing and analyzing the data collected from the mobile device (104) of the authorized user and the control unit (205).

2. The system (100) as claimed in claim 1, wherein the control device (101) locks and unlocks the lid of the fuel tank for refilling fuel when the fuel level is below a predefined threshold level.

3. The system (100) as claimed in claim 1, wherein the control device (101) locks and unlocks the lid of the fuel tank upon receiving the signal remotely from the authorized user.

4. The system (100) as claimed in claim 1, wherein the plurality of IoT sensors of the IOT devices is at least any one of an ultrasound sensor (206) or an infrared sensor (208).

5. The system (100) as claimed in claim 1, wherein the control device (101) is securely mounted on the lid of the fuel tank by the authorized user using a password.

6. The system (100) as claimed in claim 1, wherein the control device (101) sends an alert signal to the authorized user in case of drastic change experienced in fuel level.

7. The system (100) as claimed in claim 1, wherein the dynamic password is a one time password (OTP), wherein the authorized user sends the OTP to the driver of the vehicle on request.

8. The system (100) as claimed in claim 1, wherein the system (100) measures the efficiency of the vehicle, when the IoT sensor of the IOT devices is integrated with an odometer of the vehicle.

9. The system (100) as claimed in claim 8, wherein the IoT sensor transfers the data from the odometer to the control device (101).

10. The system (100) as claimed in claim 9, wherein the control device (101) further transmits data to the cloud based database server (103) for analysis.

\* \* \* \* \*